(12) United States Patent
Ishikawa et al.

(10) Patent No.: US 8,460,806 B2
(45) Date of Patent: Jun. 11, 2013

(54) MAGNETIC TAPE CARTRIDGE

(75) Inventors: Tatsuo Ishikawa, Odawara (JP);
Norihito Kasada, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/700,912

(22) Filed: Feb. 5, 2010

(65) Prior Publication Data
US 2010/0247968 A1 Sep. 30, 2010

(30) Foreign Application Priority Data
Mar. 31, 2009 (JP) .................................. 2009-088504

(51) Int. Cl.
*G11B 5/66* (2006.01)
(52) U.S. Cl.
USPC ............................ 428/838; 428/847; 360/134
(58) Field of Classification Search
None
See application file for complete search history.

(56) References Cited

U.S. PATENT DOCUMENTS

| 5,958,565 | A | 9/1999 | Hattori et al. |
| 6,805,942 | B2 * | 10/2004 | Doushita et al. ........... 428/844.8 |
| 2003/0228489 | A1 | 12/2003 | Doushita et al. |
| 2007/0077365 | A1 | 4/2007 | Nakayama et al. |

FOREIGN PATENT DOCUMENTS

| JP | 10069628 A | 3/1998 |
| JP | 10134337 A | 5/1998 |
| JP | 2004-005795 A | 1/2004 |
| JP | 2005-216367 A | 8/2005 |

OTHER PUBLICATIONS

Extended European Search Report issued Jul. 23, 2010 in corresponding European Application No. 10001812.6.
Office Action dated May 29, 2012 on Japanese Patent Application No. 2009-088504.
Office Action dated Jan. 29, 2013 in Japanese Application No. 2009-088504.

* cited by examiner

*Primary Examiner* — Holly Rickman
(74) *Attorney, Agent, or Firm* — Sughrue Mion, PLLC

(57) ABSTRACT

A magnetic tape cartridge including a reel and a pack of magnetic tape wound onto the reel, the magnetic tape includes an aromatic polyamide support and has a thickness of from 3.5 to 5.5 μm and a length of 1000 m or more, and a difference in tape thickness produced between an outer and an inner winding of the tape pack after 2-week storage of the cartridge in a dry environment at 60° C. is 60 nm or smaller.

8 Claims, No Drawings

MAGNETIC TAPE CARTRIDGE

FIELD OF THE INVENTION

This invention relates to a magnetic tape cartridge, more particularly, a magnetic tape cartridge the tape of which is required to have a storage capacity of several terabytes and exhibits excellent dimensional stability and durability.

BACKGROUND OF THE INVENTION

In recent years, means for rapidly transmitting terabyte-class information have developed remarkably, making it possible to transfer images and data providing immense information. With the development, demands for high technology for recording, reproducing, and storing the information have been increasing. Types of media for recording and reproducing information include flexible discs, magnetic drums, hard discs, and magnetic tapes. In particular, magnetic tapes have a high storage capacity per pack and are expected to meet the demands in applications to data backup and the like.

According as the use of magnetic tape spreads, magnetic tape has been required to have higher reliability for use, such as data storage, in broader use environments (especially under largely varying temperature and humidity conditions) as well as higher reliability on performance, such as stable data writing and reading, in repeated high speed running than before.

Conventional digital recording magnetic tape formats for computer use are standardized according to the read/write systems. For example, D8, DLT, and DDS formats are known. These magnetic tapes each include a nonmagnetic support, a magnetic layer containing a ferromagnetic powder and a binder on one side of the support, and a backcoat layer for securing winding quality and good running durability on the other side.

Magnetic recording media having a dual layer structure to minimize reduction in read output due to the thickness loss are known, in which a lower nonmagnetic layer having an inorganic powder dispersed in a binder is provided on a nonmagnetic support, and an upper thin magnetic layer with a thickness of 1.0 μm or less having a ferromagnetic powder dispersed in a binder is provided on the nonmagnetic layer while the nonmagnetic layer is wet.

Magnetic tapes are generally produced by processes including the steps of preparing a coating composition for each of constituent layers, applying each magnetic coating composition to a web of a nonmagnetic support, subjecting the coated web to drying, calendering (surface smoothing), and slitting to width, and winding the resulting tapes into individual cartridges. In the steps of coating composition application, drying, and calendering, the web (the coated or uncoated support of continuous form) tends to be stretched because it is handled or processed under a certain tension (for example, of about 10 kg/m in the steps of application and drying) while being unrolled from a roll of the web. After the tape cartridge production, the tape pack in the cartridge gradually contracts radially with time to cause deformation of the tape.

In order to overcome the problem, JP 10-69628A and JP 10-134337A propose using an aromatic polyamide as a nonmagnetic support. An aromatic polyamide film has higher strength than PET or PEN films and therefore may be made thinner to provide a tape with a longer length and an increased recording area per pack. It has been used as a support of compact data storage formats, such as DDS and DAT72.

SUMMARY OF THE INVENTION

However, another problem arises with such a data storage tape having a reduced thickness and an increased length per cartridge, which has been realized by using an aromatic polyamide film support to meet the need for higher storage capacity of several terabytes. That is, the tape pack of a cartridge having a tape length of 1000 m or more has seriously poor servo characteristics in a portion near its trailing end due to poor dimensional stability. More specifically, the tape undergoes a large change in width in that portion when stored in a high temperature environment. As a result of investigation into the cause, it has been revealed that an aromatic polyamide film is more compressible than PET and PEN when wound into roll and compressed in the radial direction (i.e., the film thickness direction). A magnetic tape having an aromatic polyamide support has now turned out to have the problem that the contact pressure between adjacent turns or windings increases in a portion of the tape pack close to the reel as the tape length wound onto the reel increases and, as a result, the tape in that portion undergoes a larger amount of deformation in its thickness direction, resulting in an increase of tape width, which causes deterioration of servo characteristics.

Accordingly, an object of the invention is to provide a magnetic tape cartridge the tape of which has an aromatic polyamide support, is prevented from changing its width in a portion near the reel core, and exhibits excellent dimensional stability and running durability even with a tape length of 1000 m or more per cartridge.

The above object of the invention is accomplished by a magnetic tape cartridge including a reel and a pack of magnetic tape wound onto the reel. The magnetic tape has an aromatic polyamide support, a thickness of 3.5 to 5.5 and a length of 1000 m or more. When the cartridge is stored in a dry environment at 60° C. for 2 weeks, the difference in tape thickness between an outer and an inner winding of the tape pack is within 60 nm.

The magnetic tape of the magnetic tape cartridge of the invention having an aromatic polyamide support is, when wound onto a cartridge reel even in a length of 1000 m or more, prevented from changing its width in its windings near the reel core and exhibits excellent dimensional stability and running durability.

DETAILED DESCRIPTION OF THE INVENTION

The magnetic tape cartridge of the invention includes a reel and a pack of magnetic tape wound on the reel in a length of 1000 m or more. The magnetic tape has an aromatic polyamide as a support and a thickness of 3.5 to 5.5 μm. The difference in tape thickness between an outer and an inner winding of the tape pack which is produced after 2-week storage of the tape cartridge in a dry environment at 60° C. is controlled within 60 nm.

The difference in tape thickness between an outer and an inner winding of the tape pack which is produced after 2-week storage in a dry environment at 60° C., which should be 60 nm or less, is preferably 50 nm or less, more preferably 30 nm or less.

The tape thickness, which ranges from 3.5 to 5.5 μm, is preferably 4.0 to 5.5 μm, more preferably 4.5 to 5.5 μm. With a thickness less than 3.5 μm, the tape has poor running durability due to insufficient mechanical strength. With a thickness exceeding 5.5 μm, the tape in roll form would undergo significant deformation in thickness direction, i.e., great change in tape width.

The magnetic tape of the magnetic tape cartridge of the invention (hereinafter simply referred to as the magnetic tape or magnetic recording medium of the invention) is preferably composed of an upper magnetic layer, a lower magnetic layer, an undercoat layer, a backcoat layer, and a support. The overall thickness of the tape can be controlled within the recited range by adjusting the thickness of the individual layers.

The support used in the invention is an aromatic polyamide film that retains high strength and high stiffness even with a reduced thickness.

The magnetic tape of the invention is characterized in that, when it is wound onto a cartridge reel in a length of 1000 m or more and stored in a dry environment at 60° C. for 2 weeks, the difference in thickness between an outer winding and an inner winding of the tape pack is 60 nm or smaller. Inner windings of a magnetic tape pack are subjected to high surface contact pressure by the pack compression during storage. In particular, a magnetic tape having an aromatic polyamide support that is easily deformable in the thickness direction is made thinner and thereby wider by the pack compression. On the other hand, outer windings of the tape pack are subjected to less surface pressure so that they undergo little change in thickness and width during storage. In order to control the tape thickness reduction near around the reel core during storage, it is effective to reduce the thermal shrinkage of the tape. According to JP 10-69628A, the lowest possible thermal shrinkage of the magnetic tape in the longitudinal direction is 0.05% in the storage at 70° C. and 5% RH for 24 hours. In the present invention, the tape thickness change is controlled by further reducing the thermal shrinkage. The magnetic tape of the invention has a thermal shrinkage of 0.1% or less, preferably 0.09% or less, more preferably 0.08% or less, when stored at 70° C. for 48 hours. The further reduction in thermal shrinkage may be achieved by adding an improvement to a conventional heat treatment in conventional production of magnetic tape. A preferred heat treatment is carried out by continuously running a coated web from the steps of applying and drying coating compositions under a tension of 1 to 3 kg/m through a heating zone at 130° to 160° C. for 1 to 30 seconds. Since an aromatic polyamide used as a support has a high glass transition temperature, it is possible to heat treat the coated web at higher temperatures than coated webs having other supports. It is also preferred that a coated and calendered web be heat treated under a tension of 2 to 5 kg/m at 40° to 70° C. for 8 to 40 hours. It is also preferred that the above described heat treatment be combined with a heat treatment in which a tape pancake obtained by slitting the coated web to ½ inch width and winding the resulting tape under a tension of 40 to 80 g/pancake is heat treated at 40° to 60° C. for 5 to 30 hours. A magnetic tape having a lower thermal shrinkage than conventional tape is obtained by introducing these heat treatments. The thus obtained magnetic tape pack is prevented from changing its thickness in a portion near the reel core even with a tape length of 1000 m or more. Hence, the magnetic tape of the invention allows for providing a magnetic tape cartridge having a reduced tape width variation, i.e., superior dimensional stability, over the whole length.

As repeatedly stated, the magnetic tape of the invention has an aromatic polyamide film as a nonmagnetic support.

It is desirable for the nonmagnetic support to be as thin as possible to prepare a high capacity recording medium. The thickness of the support for use in the invention is preferably 4.2 μm or smaller, more preferably 2.4 to 4.0 μm, even more preferably 2.8 to 3.8 μm. With a support thickness of 2.4 μm or more, the magnetic tape is prevented from breaking in use. A high recording capacity is assured with a support thickness of 4.2 μm or less.

The nonmagnetic support used to make the magnetic recording medium usually has its surface roughness adjusted by the incorporation of inert fine particles, e.g., of kaolin, talc, titanium dioxide, silicon dioxide (silica), calcium phosphate, aluminum oxide, zeolite, lithium fluoride, calcium fluoride, barium sulfate, carbon black, or heat resistant polymers, such as described in JP 59-5216B. It is preferred for the inert fine particles to have a narrower particle size distribution.

The nonmagnetic support preferably has a center-line average surface roughness (Ra) of 1 to 50 nm, more preferably 1 to 25 nm, even more preferably 2 to 15 nm, most preferably 3 to 10 nm, on both sides thereof (i.e., on the side where a magnetic layer is to be provided and the other side where a backcoat layer is to be provided). The support with an Ra of 1 nm or more is easy to handle during the manufacture of the magnetic recording medium. As long as the Ra of the support being 50 nm or smaller, the surface profile of the support will not be influential on that of the magnetic layer.

The Ra of the support may be measured with a three-dimensional imaging surface structure analyzer, New View series from Zygo Corp.

The nonmagnetic support may be subjected to various treatments, such as a corona discharge treatment, a plasma treatment, a heat treatment, and a cleaning treatment.

The ferromagnetic powders that can be used in the magnetic layer include ferromagnetic hexagonal ferrite powder and ferromagnetic metal powder.

Examples of the hexagonal ferrite powder that can be used include barium ferrite, strontium ferrite, lead ferrite, and calcium ferrite, and their doped compounds, such as Co-doped ferrites. Specific examples are barium ferrite and strontium ferrite of magnetoplumbite type; magnetoplumbite type ferrites coated with spinel; and barium ferrite and strontium ferrite of magnetoplumbite type containing a spinel phase in parts. These ferrites may contain, in addition to the prescribed atoms, other elements, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and Zr. Usually, ferrites doped with Co—Zn, Co—Ti, Co—Ti—Zr, Co—Ti—Zn, Ni—Ti—Zn, Nb—Zn—Co, Sb—Zn—Co, Nb—Zn, etc. can be used. The ferrite may contain impurities inherent to the raw materials and the process of preparation.

The hexagonal grains of the ferrite preferably has a tabular grain diameter of 5 to 100 nm, more preferably 10 to 60 nm, even more preferably 10 to 50 nm. In the case of magnetic recording medium with an increased track density that is reproduced with an MR head, the tabular diameter is preferably 40 nm or smaller so as to lower the particle noise. With the tabular diameter of at least 5 nm, the thermal fluctuation is reduced to stabilize the magnetization. With the diameter being 100 nm or smaller, the noise is prevented from increasing, which is advantageous for high density magnetic recording. The aspect ratio (diameter/thickness) is preferably 1 to 15, more preferably 1 to 7. Particles with an aspect ratio of 1 or higher are highly packed in a magnetic layer and exhibit sufficient orientation. With an aspect ratio of 15 or lower, the noise due to particles' stacking is reduced. In connection with the particle size, the particles within the above-recited size ranges have a BET specific surface area of 10 to 100 $m^2/g$, which approximately agrees with a surface area arithmetically calculated from the grain diameter and thickness. It is usually preferred for the hexagonal ferrite powder to have as narrow a particle size (diameter and thickness) distribution as possible. Although it is difficult to quantify the size distribution, comparison can be made among, e.g., 500 particles randomly chosen from a transmission electron micrograph. While the size distribution is mostly not normal, the coefficient of variation represented by the standard deviation $\sigma$ divided by the mean size ($\sigma$/mean) is 0.1 to 2.0. In order to make the particle size distribution sharper, the reaction system for particle formation is made as uniform as possible, and the particles produced are subjected to treatment for distribution improvement. For example, selective dissolution of ultrafine particles in an acid solution is among known treatments.

It is generally possible to prepare hexagonal ferrite powder having a coercive force (Hc) of about 500 to 5000 Oe (40 to 398 kA/m). Although a higher Hc is more advantageous for high density recording, the upper limit of Hc depends on the ability of the write head used. The coercive force (Hc) of the hexagonal ferrite powder used in the invention is preferably about 2000 to 4000 Oe (160 to 320 kA/m), still preferably 2200 to 3500 Oe (176 to 280 kA/m). Where the saturation magnetization ($\sigma$s) of the head exceeds 1.4 T, it is desirable that the coercive force of the ferrite powder be 2200 Oe (176 kA/m) or more. The coercive force can be controlled by the particle size (diameter and thickness), the kind and amount of constituent elements, the substitution site of elements, conditions of particle formation, and the like.

The hexagonal ferrite powder preferably has a saturation magnetization ($\sigma$s) of 40 to 80 A·m$^2$/kg. A relatively high $\sigma$s within that range is desirable. A saturation magnetization tends to decrease as the particle size becomes smaller. It is well known that the saturation magnetization can be improved by using a magnetoplumbite type ferrite combined with a spinel type ferrite or by properly selecting the kinds and amounts of constituent elements. It is also possible to use a W-type hexagonal ferrite powder for that purpose.

For the purpose of improving dispersibility, it is practiced to treat hexagonal ferrite powder with a surface treating agent compatible with a dispersing medium or a binder resin. Organic or inorganic compounds may be used as the surface treating agent. Typical examples are oxides or hydroxides of Si, Al or P, silane coupling agents, and titanium coupling agents. The surface treating agent is usually used in an amount of 0.1% to 10% by mass based on the ferrite powder. The pH of the hexagonal ferrite powder is of importance for dispersibility. The pH is usually adjusted to about 4 to 12. While the pH should be optimized according to the dispersing medium or binder resin, a pH of about 6 to 11 is recommended from the standpoint of chemical stability and storage stability of the magnetic recording medium. The water content of the ferrite powder is also influential on dispersibility. While varying according to the kind of the dispersing medium or binder resin, the optimal water content usually ranges from 0.01% to 2.0% by mass.

The hexagonal ferrite powder can be prepared by, for example, (1) a process by controlled crystallization of glass which includes the steps of blending barium oxide, iron oxide, an oxide of a metal that is to substitute iron, and a glass forming oxide (e.g., boron oxide) in a ratio providing a desired ferrite composition, melting the blend, rapidly cooling the melt into an amorphous solid, re-heating the solid, washing and grinding the solid to obtain a barium ferrite crystal powder, (2) a hydrothermal process which includes the steps of neutralizing a solution of barium ferrite-forming metal salts with an alkali, removing by-products, heating in a liquid phase at 100° C. or higher, washing, drying, and grinding to obtain a barium ferrite crystal powder, and (iii) a coprecipitation process which includes the steps of neutralizing a solution of barium ferrite-forming metal salts with an alkali, removing by-products, drying, treating at 1100° C. or lower, and grinding to obtain a barium ferrite crystal powder. The production of the hexagonal ferrite powder for use in the invention is not limited to any particular process.

The ferromagnetic metal powder that can be used in the magnetic layer is not particularly limited. A ferromagnetic alloy powder having $\alpha$-Fe as a main ingredient is preferred. The ferromagnetic metal powder may contain, in addition to prescribed atom, Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, etc. Ferromagnetic powders containing at least one of Al, Si, Ca, Y, Ba, La, Nd, Co, Ni, and B in addition to $\alpha$-Fe, particularly those containing at least one of Co, Al, and Y in addition to $\alpha$-Fe are preferred. More specifically, the Co content is preferably 0 to 50 ata, more preferably 15 to 35 at %, even more preferably 20 to 35 at %, based on Fe. The Y content is preferably 1.5 to 12 at %, more preferably 3 to 10 at %, even more preferably 4 to 9 at %, based on Fe. The Al content is preferably 1.5 to 12 at %, more preferably 3 to 10 at %, even more preferably 4 to 9 at %, based on Fe.

The ferromagnetic metal powder may previously be treated with a dispersant, a lubricant, a surfactant, an antistatic agent, and so on before being dispersed. Specific description of such treatments is given in JP 44-14090B, JP 45-18372B, JP 47-220623, JP 47-22513B, JP 46-28466B, JP 46-38755B, JP 47-4286B, JP 47-124222, JP 47-17284, JP 47-18509B, JP 47-18573B, JP 39-10307B, JP 46-39639B, and U.S. Pat. Nos. 3,026,215, 3,031,341, 3,100,194, 3,242,005, and 3,389,014.

The ferromagnetic metal powder may contain a small amount of a hydroxide or an oxide. The ferromagnetic metal powder can be prepared by known processes, including reduction of a composite organic acid salt (mainly an oxalate) with a reducing gas (e.g., hydrogen); reduction of iron oxide with a reducing gas (e.g., hydrogen) into Fe or Fe—Co particles; pyrolysis of a metal carbonyl compound; reduction of a ferromagnetic metal in the form of an aqueous solution by adding a reducing agent (e.g., sodium borohydride, a hypophosphite, or hydrazine); and vaporization of a metal in a low-pressure inert gas. The resulting ferromagnetic metal powder may be subjected to a known slow oxidation treatment. Slow oxidation treatment is achieved by, for example, a method in which ferromagnetic metal powder as obtained is immersed in an organic solvent, followed by drying, a method in which the powder is immersed in an organic solvent, and oxygen-containing gas is bubbled in the solvent to form an oxide film on the surface of powder particles, followed by drying, or a method in which the powder is treated in an atmosphere having a controlled oxygen to inert gas ratio to form an oxide film on its surface without using an organic solvent.

The ferromagnetic metal powder preferably has a BET specific surface area of 45 to 100 m$^2$/g, still preferably 50 to 80 m$^2$/g, so as to secure both satisfactory surface properties and low noise. The ferromagnetic metal powder preferably has a crystallite size of 8 to 18 nm, still preferably 10 to 18 nm, even still preferably 11 to 17.5 nm. The ferromagnetic metal powder preferably has a length of 0.01 to 0.15 μm, still preferably 0.02 to 0.10 μm, even still preferably 0.03 to 0.08 μm with an aspect ratio of 3 to 15, still preferably 5 to 12. The ferromagnetic metal powder preferably has a saturation magnetization $\sigma$S of 90 to 180 A·m$^2$/kg, still preferably 100 to 150 A·m$^2$/kg, even still preferably 105 to 140 A·m$^2$/kg; and a coercive force Hc of 2000 to 3500 Oe (160 to 280 kA/m), more preferably 2200 to 3000 Oe (176 to 240 kA/m).

The water content of the ferromagnetic metal powder preferably ranges from 0.01% to 2% by mass. The water content of the ferromagnetic metal powder is preferably optimized according to the kind of the binder to be combined with. The pH of the ferromagnetic metal powder, which is preferably optimized according to the kind of the binder to be combined with, usually ranges from 4 to 12, preferably 6 to 10. Where needed, the ferromagnetic metal powder may be surface treated with Al, Si, P, or an oxide thereof. The amount of the surface treatment may be 0.1% to 10% by mass relative to the ferromagnetic metal powder. The thus surface treated ferromagnetic metal powder will have an adsorption of a lubricant (e.g., a fatty acid) of not more than 100 mg/m$^2$. The ferromagnetic metal powder may contain soluble inorganic ions, such as Na, Ca, Fe, Ni, and Sr ions. While the absence of such ions is essentially desirable, presence in a total concentration up to about 200 ppm is little influential on the characteristics. The void of the ferromagnetic metal powder is preferably as small as possible. The void is preferably 20% by volume or less, still preferably 5% by volume or less. The ferromagnetic metal powder may have an acicular shape, a spindle shape, or any other general shape as long as the particle size parameters fall within the above-specified ranges. The SFD (switching field distribution) of the magnetic powder itself is preferably as small as possible. A preferred SFD is 0.8 or smaller. The ferromagnetic metal powder preferably has a narrow Hc distribution. Ferromagnetic metal powder having an SFD of 0.8 or smaller shows good electromagnetic characteristics, high output, and a sharp magnetization reversal with a small peak shift, which is advantageous for high density digital magnetic recording. The coercivity distribution can be narrowed by, for example, using goethite with a narrow size distribution, or preventing sintering of particles in the preparation of the ferromagnetic metal powder.

The binder of the magnetic layer is preferably chosen from polyurethane resins, polyester resins, and cellulose acetate in view of finely dispersing properties for ferromagnetic powder and environmental durability (against temperature and humidity changes). A polyurethane resin and a polyester resin are more preferred. A polyurethane resin is the most preferred. The polyurethane resin binder may have any known structure, such as polyester polyurethane, polyether polyurethane, polyether polyester polyurethane, polycarbonate polyurethane, polyester polycarbonate polyurethane, and polycaprolactone polyurethane.

The binder preferably contains, as a binder component, a resin having a mass average molecular weight (Mw) of more than 120,000 for the following reason. In the cases where a magnetic recording medium is produced in a successive multilayer coating method, which is preferably adopted in the invention, magnetic orientation treatment after application of a magnetic coating composition can cause the ferromagnetic powder particles to aggregate. This phenomenon, called oriented aggregation, occurs conspicuously when in using a low concentration magnetic coating composition to form a thin magnetic layer because the ferromagnetic particles are allowed to move more easily and thereby more liable to aggregate as the coating composition becomes thinner.

To prevent the oriented aggregation, it is effective to use a binder component containing, as a constituent, a resin having a higher molecular weight than binder resins conventionally employed in the art, specifically a mass average molecular weight (Mw) of more than 120,000. The resin with an Mw of more than 120,000 will hereinafter be referred to as a resin A.

It is considered that the resin A having the molecular weight stated is highly adsorptive for ferromagnetic powder particles so that the binder containing the resin A has an increased adsorptivity for ferromagnetic particles in the magnetic coating composition. As a result, the ferromagnetic particles exhibit increased three dimensional repulsion to each other in the magnetic coating composition and are thereby prevented from aggregating during orientation processing. Two or more resins A may be used in combination.

The Mw of a binder resin may be determined by gel permeation chromatography (GPC).

In view of solubility and ease of synthesis, the Mw of the resin A is preferably less than 500,000, more preferably 120,000 to 300,000, even more preferably 150,000 to 250,000.

The magnetic layer preferably contains the resin A in an amount of at least 2.5% by mass based on the ferromagnetic powder. In other words, it is preferred that the magnetic layer of the magnetic recording medium of the invention be formed using a magnetic coating composition containing at least 2.5% by mass of the resin A based on the ferromagnetic powder so that the binder has sufficient adsorptivity for ferromagnetic powder to effectively prevent oriented aggregation of the powder. The amount of the resin A in the magnetic layer is more preferably 4% to 40%, even more preferably 5% to 30%, most preferably 5% to 25%, by mass based on the ferromagnetic powder.

The resin A preferably has a Tg of −50° to 150° C., more preferably 0° to 100° C., even more preferably 30° to 90° C. The resin A preferably has an elongation at break of 100% to 2000%, a stress at break of 0.05 to 10 kg/mm$^2$ (0.49 to 98 MPa), and a yield point of 0.05 to 10 kg/mm$^2$ (0.49 to 98 MPa). The resin A may be synthesized by known methods or commercially available.

The binder component may be the resin A per se or a reaction product of the resin A and a compound having a thermosetting functional group. The magnetic recording medium of the invention is preferably produced by forming a nonmagnetic layer on a nonmagnetic support and then applying a magnetic coating composition on the nonmagnetic layer, followed by drying. When a magnetic layer is formed by applying a coating composition containing the resin A without adding a compound having a thermosetting functional group, there is formed a magnetic layer containing the resin A per se as a binder component. When a compound having a thermosetting functional group is added to the coating composition along with the resin A, a curing reaction (crosslinking reaction) is induced by the heat, e.g., of calendering or heat treatment after the application, yielding a magnetic layer containing the reaction product of the resin A and the compound as a binder component. As will be described below, when adding another resin component in addition to the resin A and the compound having a thermosetting functional group to the magnetic coating composition, the resultant reaction product may include a copolymer of the resin A, the compound containing a thermosetting functional group, and the additional resin component.

The compound having a thermosetting functional group is preferably a compound having an isocyanate group as the functional group, and more preferably a polyisocyanate having two or more isocyanate groups. Examples of the polyisocyanate include tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, and triphenylmethane triisocyanate; reaction products between these isocyanate compounds and polyalcohols; and polyisocyanates produced by condensation of these isocyanates.

These isocyanates are commercially available under, for example, the following trade names: Coronate L, Coronate HL, Coronate 2030, Coronate 2031, Millionate MR, and Millionate MTL manufactured by Nippon Polyurethane Industry Co. Ltd.; Takenate D-102, Takenate D-110N, Takenate D-200, and Takenate D-202 manufactured by Takeda Chemical Industries Co., Ltd.; and Desmodule L, Desmodule IL, Desmodule N, and Desmodule HL manufactured by Sumitomo Bayer Co., Ltd. They can be used singly or, two or more of them different in curing reactivity may be used in combination.

The binder can contain other binder components in addition to the above described binder component. Examples of the other binder components that may be employed in combination with the above described binder component are conventionally known thermoplastic resins, thermosetting resins, reactive resins, and mixtures thereof. The glass transition temperature of thermoplastic resins used in combination is preferably −100° to 200° C., more preferably −50° to 150° C.

Specific examples of the thermoplastic resins that can be used in combination include homo- and copolymers containing units derived from vinyl chloride, vinyl acetate, vinyl alcohol, maleic acid, acrylic acid, acrylic esters, vinylidene chloride, acrylonitrile, methacrylic acid, methacrylic esters, styrene, butadiene, ethylene, vinyl butyral, vinyl acetal, vinyl ether, and so on; polyurethane resins, various rubber resins, and cellulose esters.

Examples of the thermosetting resins and reactive resins that can be used in combination include phenol resins, epoxy resins, curing polyurethane resins, urea resins, melamine resins, alkyd resins, acrylic reactive resins, formaldehyde resins, silicone resins, epoxy-polyamide resins, polyester resin/isocyanate prepolymer mixtures, polyester polyol/polyisocyanate mixtures, and polyurethane/polyisocyanate mixtures. The details of these resins are described in *Plastic Handbook*, Asakura Shoten. Known electron beams curing resins are also usable. Examples of such resins and their manufacturing methods are described in detail in JP 62-256219A.

The aforementioned resins may be used either individually or in combination. Preferred resins are combinations of a polyurethane resin and at least one of a vinyl chloride resin, a vinyl chloride-vinyl acetate copolymer, a vinyl chloride-vinyl acetate-vinyl alcohol copolymer, and a vinyl chloride vinyl acetate-maleic anhydride copolymer. These combinations of resins may further be combined with a polyisocyanate. Vinyl chloride resins are particularly preferred. Combining a vinyl chloride resin further increases dispersing properties for the ferromagnetic powder, which is effective in improving electromagnetic characteristics and reducing head staining.

In order to ensure dispersing capabilities for powder and durability according to necessity, it is preferred to introduce into each the above-recited binder components at least one polar group by copolymerization or through addition reaction, the polar group being selected from —COOM, —$SO_3M$, —$OSO_3M$, —$P=O(OM)_2$, —O—$P=O(OM)_2$ (wherein M is a hydrogen atom or an alkali metal), —OH, —$NR_2$, —$N^+R_3$ (wherein R is a hydrocarbon group), an epoxy group, —SH, —CN, and so on. The amount of the polar group to be introduced is preferably $10^{-1}$ to $10^{-8}$ mol/g, still preferably $10^{-2}$ to $10^{-6}$ mol/g.

Examples of commercially available binder components useful in the invention are VAGH, VYHH, VMCH, VAGF, VAGD, VROH, VYES, VYNC, VMCC, XYHL, XYSG, PKHH, PKHJ, PKHC, and PKFE (from Union Carbide Corp.); MPR-TA, MPR-TA5, MPR-TAL, MPR-TSN, MPR-TMF, MPR-TS, MPR-TM, and MPR-TAO (from Nisshin Chemical Industry Co., Ltd.); 1000W, DX80, DX81, DX82, DX83, and 100FD (from Denki Kagaku Kogyo K.K.); MR-104, MR-105, MR110, MR100, MR555, and 400X-110A (from Zeon Corp.); Nipporan N2301, $N_{2302}$, and $N_{2304}$ (from Nippon Polyurethane Industry Co., Ltd.); Pandex T-5105, T-R3080, and T-5201, Barnock D-400 and D-210-80, and Crisvon 6109 and 7209 (from DIC, Inc.); Vylon UR8200, UR8300, UR-8700, RV530, and RV280 (from Toyobo Co., Ltd.); Daiferamin 4020, 5020, 5100, 5300, 9020, 9022, and 7020 (from Dainichiseika Color & Chemicals Mfg. Co., Ltd.); MX5004 (from Mitsubishi Chemical Corp.); Sanprene SP-150 (from Sanyo Chemical Industries, Ltd.); and Saran F310 and F210 (from Asahi Chemical Industry Co., Ltd.).

When the coating composition for magnetic layer contains the thermosetting functional group-containing compound as well as the resin A, a crosslinking reaction proceeds between the resin A and the compound in a coating layer while heating the layer to provide a magnetic layer containing the reaction product between the rein A and the compound. The resulting magnetic layer has a higher coating film strength than a magnetic layer containing the resin A itself and therefore provides a more durable magnetic recording medium. When the coating composition for magnetic layer contains the thermosetting functional group-containing compound, the amount of the compound is preferably 5% to 40%, more preferably 10% to 30%, even more preferably 15% to 25%, by mass based on the total binder components used to form the magnetic layer.

As set forth above, the magnetic layer may contain the resin A and the other binder components (such as the thermosetting functional group-containing compound and the other resin components), the details of which have previously been described. In order to avoid the oriented aggregation problem by the addition of the resin A while retaining good electromagnetic characteristics, the proportion of the resin A in the total binder components is preferably 10% to 80%, more preferably 20% to 60%, even more preferably 20% to 40%, by mass. The amount of a binder component(s) other than the resin A in the magnetic layer is preferably at least 2.5%, more preferably 4% to 40%, even more preferably 5% to 30%, most preferably 5% to 25%, by mass based on the ferromagnetic powder so as to produce the effect expected of that component.

The thickness of the magnetic layer of the magnetic recording medium of the invention preferably ranges from 0.01 to 0.2 μm. Using the resin A as a binder component to form the magnetic layer is effective in preventing the oriented aggregation problem often arising when such a relatively thin magnetic layer is formed by a successive multilayer coating method. A magnetic recording medium with high electromagnetic characteristics can thus be obtained. The thickness of the magnetic layer is more preferably 0.02 to 0.15 μm, even more preferably 0.03 to 0.12 μm.

It is preferred for the magnetic layer surface to have as small a centerline average surface roughness Ra as possible. The surface roughness Ra of the magnetic layer is determined using an AFM. The Ra of the magnetic layer is preferably 10.0 nm or less, more preferably 1.0 to 8.0 nm, even more preferably 2.0 to 6.0 nm, most preferably 2.5 to 5.0 nm. The number of micro protrusions of 10 to 20 nm in height on the magnetic layer surface is preferably 1 to 500 per 100 $\mu m^2$, more preferably 3 to 250 per 100 $\mu m^2$, even more preferably 5 to 150 per 100 $\mu m^2$, most preferably 5 to 100 per 100 $\mu m^2$.

The Ra of the magnetic layer is influenced by the surface profile of the nonmagnetic support, the dispersibility of the ferromagnetic powder in the magnetic layer, the particle size and amount of particulate additives used in the magnetic layer, such as an abrasive and carbon black, and the like. The Ra and the number of micro protrusions of the magnetic layer can be reduced by, for example, lessening the influence of the surface profile of the nonmagnetic support on that of the magnetic layer by the provision of a lower nonmagnetic layer, improving the fine dispersibility of the ferromagnetic powder, decreasing the abrasive or carbon black particle size, or reducing the amount of the abrasive or carbon black.

The surface profile of the magnetic layer can also be controlled by adjusting the calendering conditions. For example, the Ra and the number of micro protrusions can be reduced by increasing the linear pressure, extending the pressure application time, or elevating the calendering temperature.

The magnetic layer preferably has a surface resistivity of $1\times10^4$ to $1\times10^8$ Ω/sq (Ω/□), more preferably $1\times10^5$ to $1\times10^7$ Ω/sq, even more preferably $1\times10^5$ to $5\times10^6$ Ω/sq, most preferably $1\times10^5$ to $5\times10^6$ Ω/sq. The surface resistivity of the magnetic layer may be measured using the electrodes illustrated in FIG. 1 of JP 2008-77698A.

Appropriate control of the surface resistivity of the magnetic layer prevents static electrification of the magnetic recording medium thereby preventing electrostatic adhesion of dust and debris that may cause a dropout. To control the surface resistivity of the magnetic layer to the recited range is preferred because the magnetic recording medium is readily electrified particularly in a dry atmosphere, such as a low temperature low humidity environment.

The surface resistivity of the magnetic layer is adjustable by incorporating an adequate amount of a conductive material into at least one of the magnetic layer and the nonmagnetic layer. It is preferred for surface resistivity control of the magnetic layer to incorporate a conductive material to the magnetic layer or a layer as close as possible to the magnetic layer.

The nonmagnetic layer contains at least a nonmagnetic powder and a binder.

The nonmagnetic layer is not particularly limited and may contain magnetic powder as long as it is substantially nonmagnetic. The phrase "substantially nonmagnetic" means that existence of a small amount of magnetic powder that would not substantially influence the electromagnetic characteristics of the magnetic layer is acceptable. More specifically, the "substantially nonmagnetic" layer has a residual magnetic flux density of not more than 0.01 T or a coercive force of not more than 7.96 kA/m (100 Oe) and preferably has no residual magnetic flux density nor coercive force.

The nonmagnetic powder that can be used in the nonmagnetic layer are selected from inorganic compounds, such as metal oxides, metal carbonates, metal sulfates, metal nitrides, metal carbides, and metal sulfides. Examples of the inorganic compounds include α-alumina having an α-phase content of 90% or more, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. They can be used either individually or in combination. Preferred among them are titanium dioxide, zinc oxide, iron oxide, and barium sulfate, particularly titanium dioxide and α-iron oxide, because they can be prepared with a small particle size distribution and be endowed with a desired function through many means. While the nonmagnetic powder preferably has an average particle size of 0.05 to 2 μm, nonmagnetic powders different in average particle size may be used in combination, or a single kind of a nonmagnetic powder having a broadened size distribution may be used to produce the same effect. A particularly preferred particle size of the nonmagnetic powder is 0.01 to 0.2 μm. In particular, a non-acicular metal oxide powder preferably has an average particle size of 0.08 μm or smaller, and an acicular metal oxide powder preferably has a length of 0.3 μm or shorter, still preferably 0.2 μm or shorter. The tap density of the nonmagnetic powder is 0.05 to 2 g/ml, still preferably 0.2 to 1.5 g/ml. The water content of the nonmagnetic powder is preferably 0.1% to 5% by mass, still preferably 0.2% to 3% by mass, even still preferably 0.3% to 1.5% by mass. The pH of the nonmagnetic powder is preferably from 2 to 11, still preferably from 5.5 to 10.

The specific surface area of the nonmagnetic powder preferably ranges 1 to 100 m²/g, still preferably 5 to 80 m²/g, even still preferably 10 to 70 m²/g. The crystallite size is preferably 0.004 to 1 μm, still preferably 0.04 to 0.1 μm. The oil (DBP) absorption of the powder is preferably 5 to 100 ml/100 g, still preferably 10 to 80 ml/100 g, even still preferably 20 to 60 ml/100 g. The specific gravity of the powder is preferably 1 to 12, still preferably 3 to 6. The particle shape may be any of acicular, spherical, polygonal and tabular shapes. The Mohs hardness is preferably 4 to 10. The SA (stearic acid) adsorption of the nonmagnetic powder is preferably in a range of 1 to 20 μmol/m², still preferably 2 to 15 μmol/m², even still preferably 3 to 8 μmol/m². The pH of the powder is preferably between 3 and 6.

It is preferred that the nonmagnetic powder be subjected to surface treatment to have a surface layer of one or more of $Al_2O_3$, $SiO_2$, $TiO_2$, $ZrO_2$, $SnO_2$, $Sb_2O_3$, $ZnO$, and $Y_2O_3$. Among these surface treating materials, preferred for dispersibility are $Al_2O_3$, $SiO_2$, $TiO_2$, and $ZrO_2$, with $Al_2O_3$, $SiO_2$, and $ZrO_2$ being still preferred. They may be used either individually or in combination. According to the purpose, a composite surface layer may be formed by co-precipitation or a method comprising first applying alumina to the nonmagnetic particles and then treating with silica or vice versa. The surface layer may be porous for some purposes, but a homogeneous and dense surface layer is usually preferred.

Specific examples of commercially available nonmagnetic powders that can be used in the nonmagnetic layer include Nanotite from Showa Denko K.K.; HIT-100 and ZA-G1 from Sumitomo Chemical Co., Ltd.; α-Hematite DPN-250, DPN-250BX, DPN-245, DPN-270BX, DPN-550BX, DBN-SA1, and DBN-SA3 from Toda Kogyo Corp.; titanium oxide series TTO-51B, TTO-55A, TTO-55B, TTO-55C, TTO-55S, and TTO-55D, SN-100, and α-hematite series E270, E271, E300, and E303 from Ishihara Sangyo Kaisha, Ltd.; titanium oxide series STT-4D, STT-30D, STT-30, and STT-65C, and α-hematite α-40 from Titan Kogyo K.K.; MT-100S, MT-100T, MT-150W, MT-500B, MT-600B, T-100F, and T-500HD from Tayca Corp.; FINEX-25, BF-1, BF-10, BF-20, and ST-M from Sakai Chemical Industry Co., Ltd.; DEFIC-Y and DEFIC-R from Dowa Mining Co., Ltd.; AS2BM and $TiO_2$ P25 from Nippon Aerosil Co., Ltd.; 100A and 500A from Ube Industries, Ltd.; and calcined products thereof. Preferred of them are titanium dioxide products and α-iron oxide products.

The nonmagnetic layer may contain organic powder according to the purpose. Useful organic powders include acrylic-styrene resin powder, benzoguanamine resin powder, melamine resin powder, and phthalocyanine pigments. Polyolefin resin powder, polyester resin powder, polyamide resin powder, polyimide resin powder, and polyethylene fluoride resin powder are also usable. Methods of preparing these resin powders include those disclosed in JP 62-18564A and JP 60-255827A.

The binder components described above for use to make the magnetic layer, including thermoplastic resins, thermosetting resins, reactive resins, and mixture thereof, can be used to make the nonmagnetic layer. The amount of the binder in the nonmagnetic layer is preferably 5% to 50%, more preferably 10% to 30%, by mass based on the nonmagnetic powder. Where a vinyl chloride resin, a polyurethane resin, and polyisocyanate are used in combination, their amounts are preferably selected from a range of 5 to 30% by mass, a range of 2 to 20% by mass, and a range of 2 to 20% by mass, respectively. In case where head corrosion by a trace amount of released chlorine is expected to occur, polyurethane alone or a combination of polyurethane and polyisocyanate may be used. The polyurethane to be used preferably has a glass transition temperature of −50° to 150° C., still preferably 0° to 100° C., even still preferably 30° to 90° C., an elongation at break of 100 to 2000%, a stress at break of 0.05 to 10 kg/mm² (0.49 to 98 MPa), and a yield point of 0.05 to 10 kg/mm² (0.49 to 98 MPa).

The binder formulation used to make the nonmagnetic layer may be varied according to necessity in terms of the binder content, the proportions of a vinyl chloride resin, a polyurethane resin, polyisocyanate, and other resins, the molecular weight of each resin, the amount of the polar group introduced, and other physical properties of the resins. Known techniques for binder designing can be used. For example, to increase the binder content of the nonmagnetic layer is effective to increase flexibility thereby to improve head touch.

Examples of the polyisocyanate for use in the nonmagnetic layer are the same as those recited above with respect to the magnetic layer component.

The nonmagnetic layer preferably has a thickness of 0.1 to 2.0 µm. Too thick a nonmagnetic layer results in the formation of a thick magnetic recording medium and makes it difficult to achieve high recording capacity. If the thickness is too small, on the other hand, the influence of the surface profile of the nonmagnetic support would appear on the magnetic layer surface, or the effect of the nonmagnetic layer in allowing the abrasive or carbon black on the magnetic layer surface to sink would be insufficient. The thickness is more preferably 0.2 to 1.5 µm, even more preferably 0.3 to 1.0 µm.

The magnetic recording medium of the invention may have carbon black incorporated into one or both of the magnetic layer and the nonmagnetic layer. Useful carbon blacks include furnace black for rubber, thermal black for rubber, carbon black for colors, and acetylene black. The carbon black preferably has a specific surface area of 5 to 500 m²/g, a DBP absorption of 10 to 400 ml/100 g, and an average particle size of 5 to 300 nm, more preferably 10 to 250 nm, even more preferably 20 to 200 nm. The carbon black preferably has a pH of 2 to 10, a water content of 0.1% to 10% by mass, and a tap density of 0.1 to 1 g/cc. Specific examples of commercially available carbon black products which can be used in the invention include Black Pearls 2000, 1300, 1000, 900, 905, 800, and 700 and Vulcan XC-72 from Cabot Corp.; #80, #60, #55, and #35 from Asahi Carbon Co., Ltd.; #2400B, #2300, #900, #1000, #30, #40, and #10B from Mitsubishi Chemical Corp.; Conductex SC, RAVEN 150, 50, 40, and 15, and RAVEN-MT-P from Columbian Carbon; and Ketjen Black EC from Akzo Nobel Chemicals. Carbon black having been surface treated with a dispersant, etc., resin-grafted carbon black, or carbon black with its surface partially graphitized may be used. Carbon black may previously been dispersed in a binder before being added to a coating composition.

The above-enumerated carbon black species can be used either individually or as a combination thereof. The amount of carbon black, if added, is preferably 0.1% to 30% by mass based on the magnetic or nonmagnetic powder. Carbon black serves for antistatic control, reduction of friction coefficient (improvement of slip), reduction of light transmission, film strength enhancement, and the like. These functions vary depending on the species. As is well known, incorporating carbon black into the nonmagnetic layer brings about reduction of surface resistivity, reduction of light transmission, and achievement of a desired micro Vickers hardness. Addition of carbon black is also effective in holding the lubricant.

Accordingly, it is understandably possible to optimize the kind and amount of the carbon black for each layer according to the intended purpose with reference to the above-mentioned characteristics, such as particle size, oil absorption, conductivity, pH, and so forth. In selecting carbon black species for use in the magnetic and nonmagnetic layers, reference can be made, e.g., in Carbon Black Kyokai (ed.), *Carbon Black Binran*.

Data storage magnetic tapes for computer use are generally required to have high running durability in repeated use as compared with video tapes and audio tapes. To ensure such high durability, it is preferred for the backcoat layer to contain carbon black and an inorganic powder.

It is preferred to use two carbon black species different in average particle size. It is particularly preferred to use fine carbon black particles having an average particle size of 10 to 50 nm and coarse carbon black particles having an average particle size of 70 to 300 nm in combination. In general, addition of fine carbon black particles results in low surface resistivity and low light transmission of the backcoat layer. In view of the fact that many magnetic recording systems utilize a transmission of a magnetic tape as an operational signal, addition of fine carbon black particles is especially effective for application to that kind of systems. Besides, fine carbon black particles are generally excellent in lubricant holding capability and therefore contributory to reduction of the coefficient of friction where a lubricant is used in combination.

In using two kinds of carbon black having different average particle sizes in the backcoat layer, the mass ratio of fine particles to coarse particles is preferably 100/0.5 to 100/100, still preferably 100/1 to 100/50.

The total carbon black content in the backcoat layer usually ranges from 30 to 100 parts by mass, preferably 45 to 95 parts by mass, per 100 parts by mass of the binder.

It is preferred to use two kinds of inorganic powder different in hardness in the backcoat layer. Specifically, it is preferred to use a soft inorganic powder having a Mohs hardness of 3 to 4.5 and a hard inorganic powder having a Mohs hardness of 5 to 9 in combination. Addition of a soft inorganic powder having a Mohs hardness of 3 to 4.5 is effective to stabilize the friction coefficient in repeated running. Hardness of this level will not grind down the guide poles. The soft inorganic powder preferably has an average particle size of 30 to 50 nm.

The soft inorganic powders having a Mohs hardness of 3 to 4.5 include calcium sulfate, calcium carbonate, calcium silicate, barium sulfate, magnesium carbonate, zinc carbonate, and zinc oxide. They can be used either individually or as a combination of two or more thereof.

The content of the soft inorganic powder in the backcoat layer is preferably 10 to 140 parts by mass, still preferably 35 to 100 parts by mass, per 100 parts by mass of carbon black in the backcoat layer.

The hard inorganic powder having a Mohs hardness of 5 to 9 enhances the strength of the backcoat layer and thereby improves the running durability of the recording medium. A combined use of the hard inorganic powder with carbon black and the soft inorganic powder provides a stronger backcoat layer less susceptible to deterioration by repeated sliding. Moreover, existence of the hard inorganic powder in the backcoat layer produces moderate abrasive properties to reduce adhesion of grinding debris to tape guide poles, etc. When, in particular, used in combination with the soft one, the hard inorganic powder improves sliding properties on guide poles with a rough surface and thereby stabilizes the friction coefficient of the backcoat layer. The hard inorganic powder preferably has an average particle size of 80 to 250 nm, still preferably 100 to 210 nm.

The hard inorganic powder with a Mohs hardness of 5 to 9 includes α-iron oxide, α-alumina, and chromium oxide ($Cr_2O_3$). These powders can be used either individually or as a combination. Preferred of them is α-iron oxide or α-alumina. The content of the hard inorganic powder is usually 3 to 30 parts by mass, preferably 3 to 20 parts by mass, per 100 parts by mass of carbon black.

Where the soft inorganic powder and the hard inorganic powder are used in combination, they are preferably selected to have a hardness difference of 2 or greater, still preferably 2.5 or greater, even still preferably 3 or greater. It is most desirable for the backcoat layer to contain both the two kinds of inorganic powders different in Mohs hardness and having the respective specific average particle sizes and the two kinds of carbon black powders different in average particle size.

The backcoat layer may contain a lubricant that may be chosen from those described above for use in the magnetic or nonmagnetic layer. The lubricant can be added usually in an amount of 1 to 5 parts by mass per 100 parts by mass of the binder.

The backcoat layer has a thickness of, e.g., 0.2 to 0.8 μm, preferably 0.3 to 0.6 μm.

If desired, an undercoat layer for adhesion improvement may be provided between the nonmagnetic support and the nonmagnetic layer. The undercoat layer usually has a thickness of 0.01 to 0.5 μm, preferably 0.02 to 0.5 μm. Any known undercoat layer may be used.

Known abrasives mostly having a Mohs hardness of 6 or higher may be used in the present invention, either individually or as a combination thereof. Such abrasives include α-alumina having an α-phase content of at least 90%, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. A composite of these abrasives (an abrasive surface treated with another) is also useful. Existence of impurity compounds or elements, which are sometimes observed in the abrasives, will not affect the effect as long as the content of the main component is at least 90% by mass. The particle size of the abrasive is preferably 0.01 to 2 μm, more preferably 0.05 to 1.0 μm, even more preferably 0.05 to 0.5 μl. The particle size distribution is preferably as narrow as possible to ensure the electromagnetic characteristics. Abrasive grains different in average particle size may be used in combination to improve durability, or a single kind of an abrasive having a broadened size distribution may be used to produce the same effect. The abrasive preferably has a tap density of 0.3 to 2 g/cc, a water content of 0.1% to 5% by mass, a pH of 2 to 11, and a specific surface area of 1 to 30 $m^2/g$. The abrasive grains may be acicular, spherical, or cubic. Angular grains are preferred for high abrasive performance. Specific examples of commercially available abrasives that can be used in the invention are AKP-12, AKP-15, AKP-20, AKP-30, AKP-50, HIT-20, HIT-30, HIT-55, HIT-60, HIT-70, HIT-80, and HIT-100 from Sumitomo Chemical Co., Ltd.; ERC-DBM, HP-DBM, and HPS-DBM from Reynolds Metals Co.; WA10000 from Fujimi Kenmazai K.K.; UB 20 from Uyemura & CO., LTD; G-5, Chromex U2, and Chromex U1 from Nippon Chemical Industrial Co., Ltd.; TF100 and TF140 from Toda Kogyo Corp.; Beta-Random Ultrafine from Ibiden Co., Ltd.; and B-3 from Showa Mining Co., Ltd.

Incorporating the abrasive into the magnetic layer provides the magnetic recording medium with an enhanced head cleaning effect. Where needed, the abrasive may be incorporated into the nonmagnetic layer to allow for controlling the surface profile or the protrusion of the abrasive grains. As is understandable, it is preferred to optimize the grain size and the amount of the abrasive added to the magnetic or nonmagnetic layer.

The magnetic layer, nonmagnetic layer, and backcoat layer can contain other additives producing lubricating effects, antistatic effects, dispersing effects, plasticizing effects, and the like. Examples of useful additives include molybdenum disulfide, tungsten disulfide, graphite, boron nitride, graphite fluoride, silicone oils, polar group-containing silicones, fatty acid-modified silicones, fluorine-containing silicones, fluorine-containing alcohols, fluorine-containing esters, polyolefins, polyglycols, alkylphosphoric esters and alkali metal salts thereof, alkylsulfuric esters and alkali metal salts thereof, polyphenyl ethers, phenylphosphonic acid, α-naphtylphosphoric acid, phenylphosphoric acid, diphenylphosphoric acid, p-ethylbenzenephosphonic acid, phenylphosphinic acid, aminoquinones, various silane coupling agents, titan coupling agents, fluorine-containing alkylsulfuric esters and their alkali metal salts, saturated or unsaturated, straight-chain or branched monobasic fatty acids having 10 to 24 carbon atoms and their metal (e.g., Li, Na, K, Cu) salts, saturated or unsaturated, straight-chain or branched mono- to hexahydric alcohols having 12 to 22 carbon atoms, alkoxy-alcohols having 12 to 22 carbon atoms, mono-, di- or tri-fatty acid esters between saturated or unsaturated, straight-chain or branched monobasic fatty acids having 10 to 24 carbon atoms and at least one of mono- to hexahydric, saturated or unsaturated, and straight-chain or branched alcohols having 2 to 12 carbon atoms, fatty acid esters of polyalkylene oxide monoalkyl ethers, fatty acid amides having 8 to 22 carbon atoms, and aliphatic amines having 8 to 22 carbon atoms.

Examples of the fatty acids are capric acid, caprylic acid, lauric acid, myristic acid, palmitic acid, stearic acid, behenic acid, oleic acid, elaidic acid, linoleic acid, linolenic acid, and isostearic acid. Examples of the esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyl-dodecyl palmitate, isohexadecyl stearate, oleyl oleate, dodecyl stearate, tridecyl stearate, oleylerucate, neopentyl glycol didecanoate, and ethylene glycol dioleate. Examples of the alcohols are oleyl alcohol, stearyl alcohol, and lauryl alcohol. Surfactants also work well. Examples of useful surfactants include nonionic ones, such as alkylene oxide types, glycerol types, glycidol types, and alkylphenol ethylene oxide adducts; cationic ones, such as cyclic amines, ester amides, quaternary ammonium salts, hydantoin derivatives, heterocyclic compounds, phosphonium salts, and sulfonium salts; anionic ones containing an acidic group, such as a carboxyl group, a sulfonic acid group, a phosphoric acid group, a sulfuric ester group or a phoshoric ester group; and amphoteric ones, such as amino acids, aminosulfonic acids, amino alcohol sulfuric or phosphoric esters, and alkyl betaines. For the details of the surfactants, refer to *Kaimen Kasseizai Binran*, Sangyo Tosho K.K. The lubricants, surfactants, and like additives do not always need to be 100% pure and may contain impurities, such as isomers, unreacted materials, by-products, decomposition products, and oxidation products. Nevertheless, the proportion of the impurities is preferably 30% by mass at the most, more preferably 10% by mass or less.

Since the physical actions of these additives vary among individuals, the kind and amount of an additive or the mixing ratio of additives used in combination for producing a synergistic effect should be determined so as to produce optimum results according to the purpose. The following is a few illustrative examples of possible manipulations using additives. (1) Bleeding of fatty acid additives is suppressed by using fatty acids having different melting points between the magnetic layer and the nonmagnetic layer. (2) Bleeding of ester additives is suppressed by using esters different in boiling point, melting point or polarity between the magnetic layer and the nonmagnetic layer. (3) Coating stability is improved by adjusting the amount of a surfactant. (4) The amount of the lubricant in the nonmagnetic layer is increased to improve the lubricating effect.

All or part of the additives can be added at any stage of preparing coating compositions for the magnetic, nonmagnetic, and backcoat layers. For example, the additives may be blended with the magnetic or nonmagnetic powder before kneading, be mixed with the magnetic or nonmagnetic powder, the binder, and a solvent in the step of kneading, or be added during or after the step of dispersing or immediately before application. The purpose of using an additive may also be achieved by separately applying a part of, or the whole of, the additive on the magnetic or nonmagnetic layer surface either by simultaneous coating or successive coating. A lubricant may be applied to the magnetic layer surface even after calendering or slitting, which depends on the purpose. Known organic solvents, e.g., those described in JP 6-68453A, can be used in the preparation of the coating compositions.

Each of the coating compositions for the magnetic layer, nonmagnetic layer, and backcoat layer is preferably prepared by a method including the steps of kneading and dispersing and, if desired, the step of mixing which is provided before or after the step of kneading and/or the step of dispersing. Each step may be carried out in two or more divided stages. Any of the materials, including the ferromagnetic powder, nonmagnetic powder, binder, abrasive, carbon black, abrasive, antistatic, lubricant, and solvent, may be added at the beginning or in the course of any step. Individual materials may be added in divided portions in two or more steps. For example, a binder may be added dividedly in the kneading step, the dispersing step, and a mixing step provided for adjusting the viscosity of the dispersion. To accomplish the object of the invention, known techniques for coating composition preparation can be applied as a part of the method. The kneading step is preferably performed using a kneading machine with high kneading power, such as an open kneader, a continuous kneader, a pressure kneader, and an extruder. In using a kneader, the ferromagnetic or nonmagnetic powder is kneaded with a part (preferably at least 30% by mass of the total binder) or the whole of the binder and 15 to 500 parts by mass of a solvent per 100 parts by mass of the ferromagnetic or nonmagnetic powder. For the details of the kneading operation, reference can be made in JP 1-106338A and JP 1-79274A. In the step of dispersing, it is preferred to use glass beads or high-specific-gravity dispersing beads, such as zirconia beads, titania beads, and steel beads, to disperse the coating composition. The size and mixing ratio of the dispersing beads should be optimized. Known dispersing machines can be used.

In forming the nonmagnetic layer, the magnetic layer, and the backcoat layer, any known application techniques can be used, including extrusion coating, roll coating, gravure coating, microgravure coating, air knife coating, die coating, curtain coating, dipping, and wire bar coating.

When the nonmagnetic layer and the magnetic layer are formed by a successive multilayer coating method, the magnetic layer is preferably formed by extrusion coating. In this case, the magnetic layer is preferably formed by a slot-extrusion coating system having an applicator head with two slots: a feed slot and a recovery (suction) slot, so that an excess of a coating composition fed from the feed slot on a moving web is sucked through the recovery slot. In carrying out this system, the pressure for sucking the applied coating composition through the recovery slot is preferably optimized so as to form a magnetic layer with a thin and yet uniform thickness.

The slot-extrusion coating system stated is carried out as follows. The applicator head is set with its extrusion slot lips close to the nonmagnetic layer of a moving nonmagnetic support. A coating composition for magnetic layer is delivered to the applicator head and extruded through the feed slot onto the nonmagnetic layer in excess of the amount required to form a magnetic layer with a designed thickness. The excess of the applied coating composition is sucked through the recovery slot provided downstream the feed slot. The liquid pressure P (MPa) at the recovery slot is preferably controlled to satisfy relationship (I):

$$0.05(MPa) > P \geq 0(MPa) \qquad (I)$$

When a suction pump is used to suck the excess of the applied coating composition, the pressure PIN (MPa) at the inlet of the suction pump is preferably controlled to satisfy relationship (II):

$$PIN \geq -0.02(MPa) \qquad (II)$$

For more details of the above described slot extrusion system, refer to JP 2003-236452A (corresponding to US 2003/0157251A1).

The magnetic recording medium of the invention is preferably made by the following method. In a successive multilayer coating method, a coating composition for nonmagnetic layer is applied to a nonmagnetic support and dried to form a nonmagnetic layer, and, subsequently, a coating composition for magnetic layer is applied to the nonmagnetic layer and dried to form a magnetic layer. A simultaneous multilayer coating method in which a coating composition for magnetic layer is applied while the nonmagnetic layer is wet is also useful. The successive multilayer coating method is preferred in the invention.

The magnetic recording tape of the invention is preferably produced by successively forming a nonmagnetic layer and a magnetic layer on a continuous web from a roll of a nonmagnetic support, winding the coated web into roll, and slitting the coated web from the roll to width.

A coating composition for backcoat layer may previously be applied to the back side of the nonmagnetic support to prepare a roll of the backcoated nonmagnetic support or may be applied to the back side of the nonmagnetic support between the unrolling of the nonmagnetic support and the winding of the coated web either before or after the formation of the nonmagnetic layer and the magnetic layer.

The magnetic recording tape of the invention is preferably produced by the method including successively forming a nonmagnetic layer, a magnetic layer, and a backcoat layer on an unrolled, continuous web of a nonmagnetic support, winding the coated web into roll, and slitting the roll. When a backcoat layer is formed without once winding a continuous web of a nonmagnetic support having a nonmagnetic layer and a magnetic layer formed thereon, a large volume of a magnetic recording medium can be manufactured at low cost. In contrast, it is difficult to produce a large volume of a magnetic recording medium at low cost when it is produced by a method in which a continuous web of a nonmagnetic support having a nonmagnetic layer and a magnetic layer formed thereon is once wound in roll form and again unrolled for forming a backcoat layer.

To secure good productivity, the moving speed of a nonmagnetic support on which each layer is formed is preferably at least 100 m/min, more preferably 200 m/min or higher, even more preferably 300 m/min or higher, most preferably 400 m/min or higher. Although a higher coating speed is more advantageous for productivity improvement, the upper limit of the coating speed is preferably 700 m/min because coating defects, such as streaks or nonuniformity, are liable to occur at too high a coating speed.

The magnetic coating composition applied is usually subjected to magnetic orientation treatment while it is wet to have the ferromagnetic powder oriented.

The ferromagnetic metal powder is preferably oriented in the machine direction using cobalt magnets or a solenoid. While hexagonal ferrite powder is liable to have in-plane and perpendicular, three-dimensional random orientation but could have in-plane two-dimensional random orientation. It is also possible to provide a magnetic layer with circumferentially isotropic magnetic characteristics by perpendicular orientation in a known manner, for example, by using facing magnets with their polarities opposite. Perpendicular orientation is preferred for high density recording.

Each of applied coating compositions is dried by, for example blowing hot air. The drying air temperature is preferably 60° C. or higher. The amount of drying air to be blown is decided according to the amount of the coating composition applied and the drying air temperature. The coating layer may be pre-dried before entering the magnet zone of orientation treatment.

After drying, the web having the nonmagnetic layer, magnetic layer, and backcoat layer is usually calendered. Calendering is carried out using metallic rolls or rolls of heat-resistant plastics, such as epoxy resins, polyimide, polyamide, and polyimide-amide. Calendering is preferably carried out at a temperature of 50° C. or higher, more preferably 90° C. or higher, under a linear pressure of 200 kg/cm (196 kN/m) or higher, more preferably 300 kg/cm (294 kN/m) or higher.

EXAMPLES

The present invention will now be illustrated in greater detail with reference to Examples and Comparative Examples, but it should be understood that the invention is not construed as being limited thereto. Unless otherwise noted, all the parts and percentages are by mass.

Example 1

(1) Preparation of Coating Compositions

| (1-1) Formulation of magnetic coating composition for upper layer | |
|---|---|
| Ferromagnetic tabular hexagonal ferrite powder (composition except oxygen (molar ratio): Ba/Fe/Co/Zn = 1/9/0.2/1; Hc: 159 kA/m (2000 Oe); diameter: 25 nm; aspect ratio: 3; BET specific surface area: 80 m$^2$/g; σs: 50 A · m$^2$/kg (50 emu/g)) | 100 parts |
| Polyurethane resin (branched side chain-containing polyester polyol/diphenylmethane diisocyanate type; —SO$_3$Na content: 150 eq/ton) | 15 parts |
| Phenylphosphonic acid | 3 parts |
| Alpha-Al$_2$O$_3$ (average particle size: 0.15 μm) | 5 parts |
| Tabular alumina powder (average particle size: 50 nm) | 1 part |
| Carbon black (particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |

| (1-2) Formulation of nonmagnetic coating composition for lower layer | |
|---|---|
| Alpha iron oxide (surface treating agent: Al$_2$O$_3$ and SiO$_2$; length: 0.15 μm; tap density: 0.8 g/ml; aspect ratio: 7; BET specific surface area: 52 m$^2$/g; pH: 8; DBP absorption: 33 g/100 g) | 85 parts |
| Carbon black (BET specific surface area: 250 m$^2$/g; DBP absorption: 120 ml/100 g; pH: 8; volatile content: 1.5%) | 20 parts |
| Polyurethane resin (branched side chain-containing polyester polyol/diphenylmethane diisocyanate type; —SO$_3$Na content: 70 eq/ton) | 15 parts |
| Phenylphosphonic acid | 3 parts |
| Alpha-Al$_2$O$_3$ (average particle size: 0.2 μm) | 5 parts |
| Cyclohexanone | 140 parts |
| Methyl ethyl ketone | 170 parts |
| Butyl stearate | 2 parts |
| Stearic acid | 1 part |

| (1-3) Formulation of coating composition for backcoat layer | |
|---|---|
| Carbon black (average particle size: 25 nm) | 40.5 parts |
| Carbon black (average particle size: 370 nm) | 0.5 parts |
| Barium sulfate | 4.05 parts |
| Nitrocellulose | 28 parts |
| Polyurethane resin (containing —SO$_3$Na) | 20 parts |
| Cyclohexanone | 100 parts |
| Toluene | 100 parts |
| Methyl ethyl ketone | 100 parts |

The components of each of formulations (1-1) and (1-2) were kneaded in an open kneader for 60 minutes and then dispersed in a sand mill for 120 minutes. To the dispersion were added 6 parts of a low molecular, trifunctional polyisocyanate compound (Coronate 3041 from Nippon Polyurethane Industry Co., Ltd.), followed by stirring for 20 minutes. The dispersion was filtered through a filter having an average opening size of 1 μm to prepare a magnetic or nonmagnetic coating composition. The coating composition for backcoat layer was prepared by dispersing the components of formulation (1-3) in a sand mill for a retention time of 45 minutes, adding 8.5 parts of polyisocyanate, followed by stirring and filtration.

(2) Making a Magnetic Tape Cartridge

The nonmagnetic coating composition was applied to a continuous web of an aromatic polyamide (aramid) film support (thickness: 3.6 μm; Young's modulus: 1100 kg/mm$^2$ in MD, 1600 kg/mm$^2$ in CD) to a dry thickness of 0.8 μm and dried at 100° C. Immediately thereafter, the magnetic coating composition was applied thereto wet-on-dry to a dry thickness of 0.08 μm and dried at 100° C. The coated web was subjected to random magnetic orientation through two alternating magnetic field generators having a frequency of 50 Hz and an intensity of 25 mT (250 Gauss) and 12 mT (120 Gauss), respectively. The coating composition for backcoat layer was applied to the back side of the web opposite to the nonmagnetic and the magnetic layers to a dry thickness of 0.5 µm and dried to obtain a roll of the coated web. The coated web was unrolled and passed through a heat treatment zone kept at 130° C. under a tension of 3.0 kg/m. The retention time in the heat treatment zone was 15 seconds. The coated web was smoothed by calendering on a 7-roll (all metallic) calender under conditions of 90° C. in roll temperature, 300 kg/cm in linear pressure, and 4.0 kg/m in take-off tension. The calendered web was heat treated at 60° C. for 36 hours and then slit to half inch width to obtain magnetic tapes. Servo signals were written on the magnetic tape, and the tape was wound into an LTO cartridge case to obtain a magnetic tape cartridge.

Example 2

A magnetic tape cartridge was made in the same manner as in Example 1, except that the half-inch tape was wound into a pancake at a tension of 60 g/pancake and heat treated in a dry environment at 50° C. for 12 hours.

Example 3

A magnetic tape cartridge was made in the same manner as in Example 1, except for changing the thickness of the aromatic polyamide film support to 4.1 µm.

Example 4

A magnetic tape cartridge was made in the same manner as in Example 1, except for changing the thicknesses of the aromatic polyamide film support, the nonmagnetic layer, and the backcoat layer to 2.5 µm, 0.6 µm, and 0.3 µm, respectively.

Example 5

A magnetic coating composition was prepared in the same manner as in Example 1, except for using the following formulation to prepare a magnetic coating composition. The same nonmagnetic coating composition as used in Example 1 was applied to the same support as used in Example 1 to a dry thickness of 0.8 µm and dried at 100° C. Immediately thereafter, the magnetic coating composition was applied thereto wet-on-dry to a dry thickness of 0.08 µm and dried at 100° C. The coated web was subjected to magnetic orientation using magnets of 300 mT (3000 Gauss) while the magnetic layer was wet. The coated web was further processed in the same manner as in Example 1 to obtain a magnetic tape cartridge.

| Formulation of magnetic coating composition for upper layer | |
|---|---|
| Ferromagnetic acicular metal powder (composition: Fe/Co/Al/Y = 62/25/5/8; surface treating agent: $Al_2O_3$ and $Y_2O_3$; Hc: 167 kA/m (2100 Oe); crystallite size: 11 nm; length: 60 nm; aspect ratio: 6; BET specific surface area: 70 m²/g; σs: 110 A · m²/kg (110 emu/g)) | 100 parts |
| Polyurethane resin (branched side chain-containing polyester polyol/diphenylmethane diisocyanate type; —$SO_3Na$ content: 70 eq/ton) | 15 parts |
| Phenylphosphonic acid | 3 parts |
| Alpha-$Al_2O_3$ (average particle size: 0.15 µm) | 2 parts |
| Carbon black (particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |

Comparative Example 1

A comparative magnetic tape cartridge was made in the same manner as in Example 1, except that the heat treatment before calendering was carried out by passing the unrolled coated web through a heat treatment zone kept at 110° C. at a tension of 3.0 kg/m for a retention time of 5 seconds.

Comparative Example 2

A comparative magnetic tape cartridge was made in the same manner as in Example 1, except for using a 4.4 µm thick aromatic polyamide film as a support and changing the thickness of the lower nonmagnetic layer to 1.0 µm.

Comparative Example 3

A comparative magnetic tape cartridge was made in the same manner as in Comparative Example 2, except that the half-inch tape was wound into a pancake under a tension of 60 g/pancake and heat treated in a dry environment at 50° C. for 12 hours.

Comparative Example 4

A comparative magnetic tape cartridge was made in the same manner as in Example 1, except for using a 2.3 µm thick aromatic polyamide film as a support and changing the thicknesses of the lower nonmagnetic layer and the backcoat layer to 0.5 µm and 0.3 µm, respectively.

Comparative Example 5

A comparative magnetic tape cartridge was made in the same manner as in Example 1, except for using a 3.6 µm thick polyethylene naphthalate (PEN) film having a Young's modulus of 750 kg/mm² in MD and 700 kg/mm² in CD as a support.
Evaluation The tape cartridges obtained in Examples and Comparative Examples were evaluated as follows. The results obtained are shown in Table 1 below.

(1) Tape Thickness

Ten pieces of appropriate size cut out of the tape were stacked one on top of another. The thickness of the stack was measured with a micrometer to calculate the thickness per piece.

(2) Thermal Shrinkage of Tape

A 100 mm long sample of the tape vertically with a 70 mg weight attached to the lower end of the sample was stored in a dry environment at 70° C. for 48 hours. After the storage, the length of the sample was measured with a comparator to calculate the thermal shrinkage (%) from formula:

Thermal shrinkage (%)=(length before storage−length after storage)/length before storage×100

(3) Difference in Tape Thickness Between Outer Winding and Inner Winding of Tape Pack after 2-Week Storage in 60° C. Dry Environment The tape cartridge was stored in a dry environment at 60° C. for two weeks. After the storage, a piece was cut out from the portion of the tape pack 5 m away from the trailing end of the leader tape, and the thickness of the cut piece was measured with a high-precision film thickness meter Millimar 1240 (from Mahr GmbH) immediately (preferably within 30 minutes) after the cutting out. The measurement was repeated 10 times to obtain an average tape thickness of the outer winding. The reason the thickness measurement should be taken immediately after the cutting out operation is that otherwise the tape that had been radially pressed thinner might restore its original thickness with no pressure applied between adjacent windings. In the same manner, a piece was cut out from the portion of the tape 10 m away from the trailing end of the magnetic tape attached to the reel, and the thickness of the cut piece was measured with Millimar 1240. The measurement was repeated 10 times to obtain an average tape thickness of the inner winding. The difference in tape thickness between the outer and the inner windings was thus obtained.

(4) Difference in Tape Width Between Outer Winding and Inner Winding of Tape Pack after 2-Week Storage in 60° C. Dry Environment The width of each of the outer and the inner windings of the tape pack as prepared in (3) above was measured with a comparator. The measurement was repeated three times to obtain an average. The difference in tape width between the outer and the inner windings was thus obtained.

(5) Servo Tracking Error

The magnetic tape cartridge was run over its whole length on an LTO-4 drive (from IBM) after the storage in a dry environment at 60° C. for two weeks, and the number of off-track errors was counted. The running test was carried on ten cartridges to obtain the ratio of the cartridges having the servo tracking error.

(6) Edge Deformation after Repeated Running

The magnetic tape cartridge was run 500 passes on an LTO-4 drive (from IBM). The deformation of the tape edge was observed with the naked eye and graded as follows.
A: No appreciable edge deformation was observed.
B: Slight edge deformation was observed.
C: Considerable edge deformation was observed.

(7) Suitability to Winding in Length of 1000 M or More

The magnetic tape was scored "S (success)" when it was able to be wound in a length of 1000 m or more into an LTO cartridge, or scored "F (failure)" when it was unable.

The magnetic tapes of the magnetic tape cartridges of the invention (Examples 1 to 5) include an aromatic polyamide film as a support, have a thickness of 3.5 to 5.5 μm and, after the two-week storage in a dry environment at 60° C., show a thickness difference of 60 nm or less between the outer and inner windings thereof. As can be seen from the results in Table 1, they exhibit a low thermal shrinkage and a reduced difference in width between the outer and the inner windings and therefore have a low servo tracking error and high edge durability in repeated running. On the other hand, the magnetic tape of Comparative Example 1, which was heat treated at a lower temperature after the application and drying steps, has a high thermal shrinkage and, as a result, a thickness difference exceeding 60 nm, which is out of the scope of the present invention. Hence, the pack of the tape has a markedly large difference in width between the outer and the inner windings thereof, which leads to a drastically increased servo tracking error. In Comparative Example 2, where the tape thickness exceeds the upper limit as defined by the invention, since the support forms an increased proportion in the total tape thickness, a still larger difference in tape thickness results, which leads to a very high servo tracking error. Moreover, the length of the tape wound into the cartridge is shorter than 1000 m, resulting in insufficient recording capacity. In Comparative Example 3, where the tape thickness is larger than as defined by the invention, the tape thickness difference between the outer and the inner windings of the pack is controlled within the range defined by the invention by enhancing the heat treatment so that the servo tracking error is not so high as in Comparative Examples 1 and 2. However, because the length of the tape wound into the cartridge is shorter than 1000 m, the cartridge has an insufficient recording capacity. In Comparative Example 4, where the tape thickness is, in contrast, smaller than as defined by the invention, the tape suffers from considerable edge deformation in repeated running due to lack of stiffness. In Comparative Example 5, because the PEN support used is less deformable in the thickness direction than the aromatic polyamide film, the tape width difference between the outer and the inner windings of the tape pack is small so that the servo tracking error is low. However, the tape undergoes considerable edge deformation in repeated running because of the poorer mechanical strength of the PEN film per se than that of the aromatic polyamide film in both the MD and the CD.

The magnetic tape cartridge of the invention is useful for a large-capacity data storage system.

TABLE 1

|  | Support | Tape Thickness (μm) | Tape Thickness Difference (μm) | Tape Thermal Shrinkage (%) | Tape Width Difference (μm) | Servo Tracking Error (%) | Edge Deformation | Winding Suitability |
| --- | --- | --- | --- | --- | --- | --- | --- | --- |
| Example 1 | aramid | 5.0 | 50 | 0.085 | 3 | 20 | A | S |
| Example 2 | aramid | 5.0 | 30 | 0.07 | 2 | 0 | A | S |
| Example 3 | aramid | 5.5 | 60 | 0.09 | 5 | 30 | A | S |
| Example 4 | aramid | 3.5 | 40 | 0.08 | 2.5 | 10 | B | S |
| Example 5 | aramid | 5.0 | 50 | 0.085 | 3 | 20 | A | S |
| Comp. Example 1 | aramid | 5.0 | 70 | 0.11 | 9 | 70 | A | S |
| Comp. Example 2 | aramid | 6.0 | 80 | 0.12 | 10 | 90 | A | F |
| Comp. Example 3 | aramid | 6.0 | 60 | 0.095 | 6 | 40 | A | F |
| Comp. Example 4 | aramid | 3.2 | 30 | 0.075 | 2 | 10 | C | S |
| Comp. Example 5 | PEN | 5.0 | 20 | 0.16 | 3 | 20 | C | S |

What is claimed is:

1. A magnetic tape cartridge comprising a reel and a pack of magnetic tape wound onto the reel, the magnetic tape comprising an aromatic polyamide support and having a thickness of from 3.5 to 5.5 µm and a length of 1000 m or more, and wherein the magnetic tape has a thermal shrinkage in a longitudinal direction of 0.09% or less when the tape is stored in a dry environment at 70° C. for 48 hours, a difference in tape thickness produced between an outer and an inner winding of the tape pack after 2-week storage of the cartridge in a dry environment at 60° C. being 60 nm or smaller.

2. The magnetic tape cartridge according to claim 1, wherein the difference in tape thickness produced between an outer and an inner winding of the tape pack after 2-week storage of the cartridge in a dry environment at 60° C. is 50 nm or smaller.

3. The magnetic tape cartridge according to claim 1, wherein the difference in tape thickness produced between an outer and an inner winding of the tape pack after 2-week storage of the cartridge in a dry environment at 60° C. is 30 nm or smaller.

4. The magnetic tape cartridge according to claim 1, wherein the aromatic polyamide support has a thickness of 4.2 µm or smaller.

5. The magnetic tape cartridge according to claim 1, wherein the aromatic polyamide support has a thickness of from 2.4 to 4.0 µm.

6. The magnetic tape cartridge according to claim 1, wherein the magnetic tape has a thermal shrinkage in a longitudinal direction of 0.08% or less when the tape is stored at 70° C. for 48 hours.

7. The magnetic tape cartridge according to claim 1, wherein the magnetic tape has a thickness of from 4.0 to 5.5 µm.

8. The magnetic tape cartridge according to claim 1, wherein the magnetic tape has a thickness of from 4.5 to 5.5 µm.

* * * * *